(12) United States Patent
Smith

(10) Patent No.: US 9,953,432 B2
(45) Date of Patent: Apr. 24, 2018

(54) SYSTEMS AND METHODS OF DETECTING MOTION

(71) Applicant: David M. Smith, Plano, TX (US)

(72) Inventor: David M. Smith, Plano, TX (US)

( * ) Notice: Subject to any disclaimer, the term of this patent is extended or adjusted under 35 U.S.C. 154(b) by 0 days.

(21) Appl. No.: 15/634,417

(22) Filed: Jun. 27, 2017

(65) Prior Publication Data

US 2018/0053313 A1 Feb. 22, 2018

Related U.S. Application Data

(60) Provisional application No. 62/376,011, filed on Aug. 17, 2016.

(51) Int. Cl.
| | |
|---|---|
| *G06T 7/292* | (2017.01) |
| *H04N 7/18* | (2006.01) |
| *G06K 9/64* | (2006.01) |
| *G06K 9/62* | (2006.01) |
| *G06K 9/00* | (2006.01) |
| *B60R 11/04* | (2006.01) |
| *B60R 11/00* | (2006.01) |

(52) U.S. Cl.
CPC ............. *G06T 7/292* (2017.01); *B60R 11/04* (2013.01); *G06K 9/00771* (2013.01); *G06K 9/6215* (2013.01); *G06K 9/64* (2013.01); *H04N 7/181* (2013.01); *B60R 2011/004* (2013.01)

(58) Field of Classification Search
CPC ... G06T 7/292; B60R 11/04; B60R 2011/004; G06K 9/00771; G06K 9/64; G06K 9/6215; H04N 7/181
USPC ......................................................... 382/107
See application file for complete search history.

(56) References Cited

U.S. PATENT DOCUMENTS

| | | | |
|---|---|---|---|
| 6,789,015 | B2 | 9/2004 | Tsuji et al. |
| 7,071,964 | B1 | 7/2006 | Glatt |
| 9,207,679 | B1 | 12/2015 | Chatham |
| 9,215,429 | B2 | 12/2015 | Englander et al. |
| 2004/0041905 | A1* | 3/2004 | Shibayama ........ G06K 9/00771 348/47 |
| 2007/0069872 | A1* | 3/2007 | Arakawa ............... B62D 15/029 340/435 |
| 2008/0136914 | A1 | 6/2008 | Carlson et al. |
| 2008/0252444 | A1 | 10/2008 | Batot et al. |
| 2010/0245072 | A1 | 9/2010 | Harel |
| 2012/0063737 | A1 | 3/2012 | Gregoire |
| 2014/0253760 | A1* | 9/2014 | Watanabe .............. H04N 5/142 348/239 |
| 2014/0294233 | A1* | 10/2014 | Osamura ............... G06T 7/0075 382/103 |
| 2015/0145997 | A1 | 5/2015 | Terashima |
| 2016/0075282 | A1 | 3/2016 | Johnson |
| 2016/0086333 | A1 | 3/2016 | Scholl et al. |

FOREIGN PATENT DOCUMENTS

CN 201484287 U 5/2010

* cited by examiner

*Primary Examiner* — Amandeep Saini
(74) *Attorney, Agent, or Firm* — Kirby B. Drake; Klemchuk LLP

(57) ABSTRACT

Motion is detected within a defined proximity of a vehicle or fixed location equipped with a recording system by correlating frame-to-frame changes in the video streams of two or more cameras with converging views.

4 Claims, 12 Drawing Sheets

SYSTEMS AND METHODS OF DETECTING MOTION

CROSS REFERENCE TO RELATED APPLICATION

This application claims the benefit under 35 U.S.C. § 119(e) of U.S. Provisional Patent Application Ser. No. 62/376,011 filed on Aug. 17, 2016, entitled "Systems and Methods of Detecting Motion," which is incorporated by reference in its entirety.

FIELD OF THE DISCLOSURE

The present disclosure generally relates to motion detection, and more particularly to motion detection by correlating frame-to-frame changes in the video streams of two or more cameras with converging views.

BACKGROUND

Surveillance cameras, that is video cameras associated with recording equipment for security purposes, are widely found in and around commercial and residential buildings. These cameras are considered extremely useful in the deterrence of crime and vandalism as well as the capture and prosecution of culprits. Surveillance cameras associated with motor vehicles of all types are much less prevalent, and are primarily so-called dash-cams, which record one or two scenes (front and rear). Many of these cameras record only when the engine of the motor vehicle is running, but some have a parking mode in which recording is triggered by motion or vibration. This mode is intended to save recording space, since in a vehicle the recording medium is generally an SD flash card with limited capacity, and security is generally a problem during the long periods when the vehicle is idle.

Motion detection is also used with fixed-location surveillance systems to time-mark the points in long hours of video recording where there may be a security interest, such as a possible intruder. A "motion detection" function in a surveillance system commonly consists of comparing successive frames of a video stream and identifying differences. Differences in a scene from one frame to another that exceed a preset threshold are declared to be "motion." This is a simplistic approach, but suitable to the limited processing power available. Since the approach is susceptible to scene changes that are of no security interest (for example, pedestrians on the other side of a street or tree limbs moving with the wind), such systems also provide a means for the user to manually "mask out" parts of the scene to avoid false positives. The user may be provided with a graphical user interface displaying the scene from a camera overlaid with a grid. The user then selects squares of the grid to be ignored, or masked, for the purpose of motion detection. The scene itself is usually recorded in its entirety. This method is reasonably effective when surveilling a fixed location and where it is possible to angle the camera to allow certain parts of the scene to be isolated and masked to exclude false positives. For example, if a camera can be mounted on an exterior wall and angled downward in such as way that a driveway can be separated in its view from the alley it connects to, then the alley can be masked, and motion detection limited to changes that occur in the driveway. However, this method is not suitable for surveillance from a vehicle, since the vehicle can in principle be parked anywhere and it is not convenient for the vehicle operator to manually review and mask the scene from each camera every time the vehicle is parked. Furthermore, it is not suitable where a camera view must be substantially level with the ground, such that background scenery registers in the same image region of the image as a potential security interest, for example, a person moving in an area where there is a busy street in the background.

Another well-known method of motion detection is the Passive Infra-Red (PIR) detector, which relies on infrared radiation emitted from warm objects (such as humans) that can be distinguished from background infrared. A PIR detector is commonly used to control outdoor lights. However, it will not reliably detect people 'bundled up' with layers of clothing, or vehicles that are at the same temperature as the surroundings. Also, since its range of detection is controlled by its gross sensitivity and the level of infrared emitted, it is not possible to accurately define a range of proximity that it can be limited to. Therefore what is needed is a better method of detecting and discriminating motion that may be of interest from a security standpoint from motion of no interest in a surveillance system.

SUMMARY

Embodiments of the present disclosure may provide means of identifying scene changes as of interest (Scenery of Interest) by correlating in time the scene changes between two or more cameras set up to have converging views, optionally further correlating in time the luminosity and/or color of such changes, and using the parallax between them to compute proximity. The correlation in combination with computed proximity within a predefined range together constitute an indication of motion of interest. This process will be referred to as coordinated differential detection ("CDD"). A scene change is defined as a change to a limited area of an image, in successive images in time or frames of a video stream.

Embodiments of the present disclosure may provide two video cameras horizontally displaced from each other, with converging fields of view; means of detecting frame-to-frame scene changes in a camera, that outputs the coordinates of each area of change in the camera's image and optionally the hue and luminosity; further means that takes the output of the previous means for each camera and correlates scene changes that are simultaneous between cameras, of comparable vertical height, and optionally of comparable luminosity and/or hue; then outputs the horizontal image coordinates; further means that evaluates the displacement of horizontal coordinates to determine the distance to the movement causing the scene change, and outputs a signal that may be used to start recording if the distance is within a preset limit, or to mark an ongoing recording, or to raise an alarm. The means described herein may be relatively easy to implement in low-cost commercial programmable logic, compared with much more sophisticated and elaborate image processing needed to identify and track objects using software algorithms, and then use that information to estimate distance and interest. In some cases it may be necessary displace the cameras vertically instead of horizontally. Then the parallax is determined by the displacement of vertical coordinates in the camera images, rather than horizontal. In general, the geometry of the system may be rotated around an axis from the cameras to the area under surveillance without changing the operating principle.

Some embodiments of the present disclosure may provide a method of identifying scene changes as of interest, the method comprising: detecting frame-to-frame scene changes in two video cameras displaced from one another and having converging fields of view to output coordinates of each area of change; using the coordinates of each area of change, correlating scene changes that are simultaneous between the two cameras of comparable vertical height, and outputting image coordinates; evaluating displacement of the image coordinates to determine distance to movement causing the scene changes, and outputting a signal that instructs performance of one of a plurality of actions. The method also may comprise correlating in time color of the scene changes; and computing proximity using a parallax between the scene changes. The method may further comprise correlating in time luminosity of the scene changes; and computing proximity using a parallax between the scene changes. The scene changes may be changes to a limited area of an image in successive images in time or frames of a video stream.

Further embodiments of the present disclosure may provide a system for surveilling an area around a motor vehicle, the system comprising: one or more camera pods attached to a roof of the motor vehicle; and a central recording unit connected to the one or more camera pods, wherein the central recording unit supplies power to the one or more camera pods, sends instructions to the one or more camera pods, receives streaming video and/or successive still images from the one or more camera pods, performs coordinated differential detection, and records to its own data storage or a remote data storage. One or more flat power and data cables may connect the one or more camera pods to the central recording unit. The central recording unit may be mounted under a driver seat of the motor vehicle. Each of the one or more camera pods may include two cameras having fields of view pointing in opposite directions along an axis inclined at approximately 45 degrees to an axis of the motor vehicle, wherein the fields of view may create a sector of convergence where an object appears to a pair of cameras. The sector of convergence may be a primary sector of convergence when created by cameras in adjacent ones of the one or more camera pods. The sector of convergence may be a secondary sector of convergence when created by non-adjacent cameras. Each of the two cameras may include a lens assembly, a lens holder, and an image sensor. Each of the one or more camera pods may include a baseboard having a field programmable gate array (FPGA), wherein the FPGA may communicate with the central recording unit and control each camera's mode of operation and whether it captures streaming video or successive still images. The system may have a drive mode of operation and a park mode of operation. When the system is in a drive mode of operation, the central recording unit may receive streaming video data from each camera and the streaming video data may be recorded onto the data storage. When the system is in a park mode of operation, the system may run on battery power supplied by the motor vehicle and images may be sampled using coordinated differential detection.

Additional embodiments of the present disclosure may provide a system for surveilling an area around a motor vehicle, the system comprising: one or more camera pods attached to a roof of the motor vehicle, each of the one or more camera pods including two cameras having fields of view pointing in opposite directions along an axis inclined at approximately 45 degrees to an axis of the motor vehicle, wherein the fields of view may create a sector of convergence where an object appears to a pair of cameras; and a central recording unit connected to the one or more camera pods and including a field programmable gate array (FPGA) or other low-power logic device that performs coordinated differential detection for the sector of convergence to identify an approximate position for the object in the area around the motor vehicle. The FPGA may be configured to capture image frames from each of the two cameras at a predetermined interval, decompress image data associated with the image frames to create a decompressed frame, and compute a differential with a stored decompressed frame. The FPGA may be further configured to identify differentials for selected pairs of image frames that share an approximate height above ground and involve comparable color hues or luminosities. The central recording unit may perform a sequence of coordinated differential detection to approximate trajectory and speed of the object in the area around the motor vehicle. The FPGA may be configured to perform a decimation of differentials derived from each of the cameras to arrive at a lower resolution for use in correlation. The FPGA may be configured to correlate differentials at approximately the same vertical height between the two cameras.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure apply the principle of coordinated differential detection (CDD) to the problem of surveillance around a motor vehicle, such as a passenger car, and in particular, the problem of maintaining continuous surveillance during extended periods when the motor vehicle is parked and the engine switched off. Even with the storage technologies available today, continuous video recording from multiple points of view for many hours can require infeasibly large storage capacity. Furthermore, continuous streaming and recording can require more electrical energy than the motor vehicle's battery can supply for extended periods, without compromising its ability to start the engine. Embodiments of the present disclosure further illustrate the principle applied as an after-market product attached to the motor vehicle, although it will be appreciated that virtually the same embodiment may be built into the structure of the motor vehicle by its original manufacturer.

Figure 1:
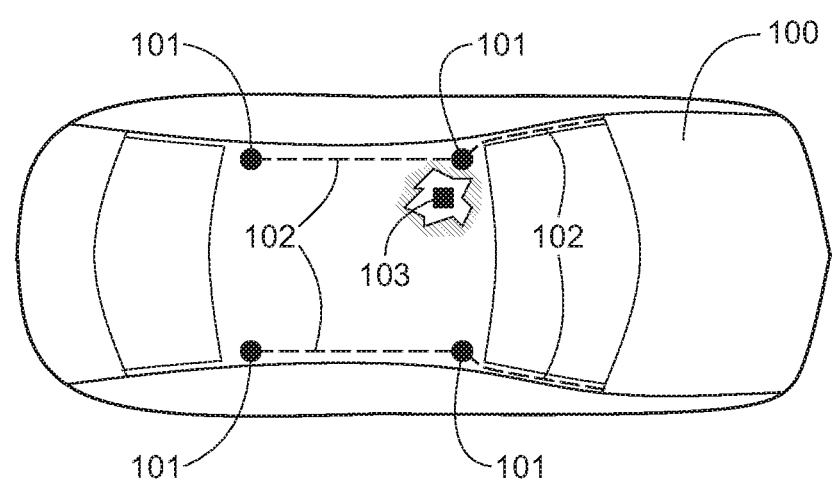
FIG. 1 depicts an illustration looking down at the top of a representative motor vehicle, depicting the locations of pods containing pairs of video cameras arranged to acquire scenery around the motor vehicle according to an embodiment of the present disclosure.

Referring to FIG. 1, camera pods 101 may be attached at four locations on top of the roof of passenger car 100. Flat power and data cables 102 may interconnect pods 101 with Central Recording Unit 103, mounted under the driver's seat, which may supply power to pods 101, send instructions to pods 101, receive streaming video and/or successive still images from pods 101, perform CDD, and record to its own data storage. Central Recording Unit 103 will be discussed in more detail herein.

Figure 2A:
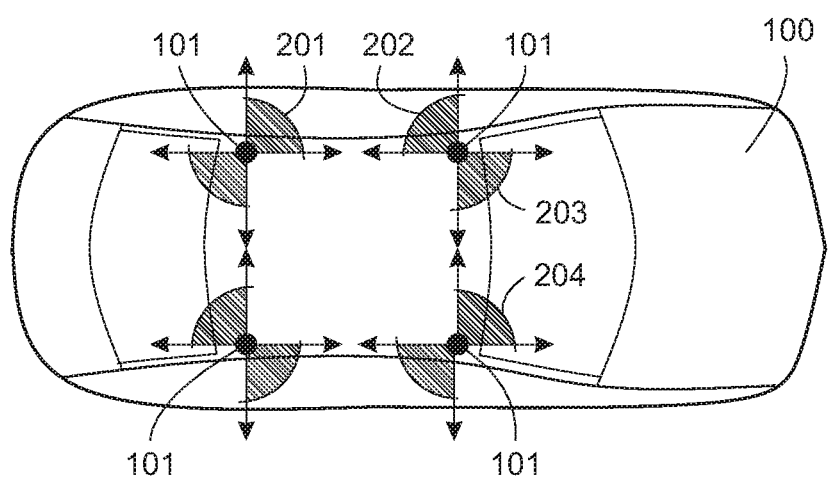
FIG. 2a depicts the fields of view of eight cameras disposed in four pods according to an embodiment of the present disclosure.

Referring to FIG. 2a, pod 101 may contain two cameras, along with other supporting electronics which will be described herein. In this illustration, each pod 101 may contain cameras with fields of view pointing in opposite directions along an axis inclined at 45 degrees to the axis of the motor vehicle, for example, fields of view 202 and 203. The fields of view may be assumed to subtend approximately 90 degrees, as this is a value that is easily attainable with inexpensive cameras and lenses. The particular fields of view 201 through 204 will be described in the following figures.

Figure 2B:
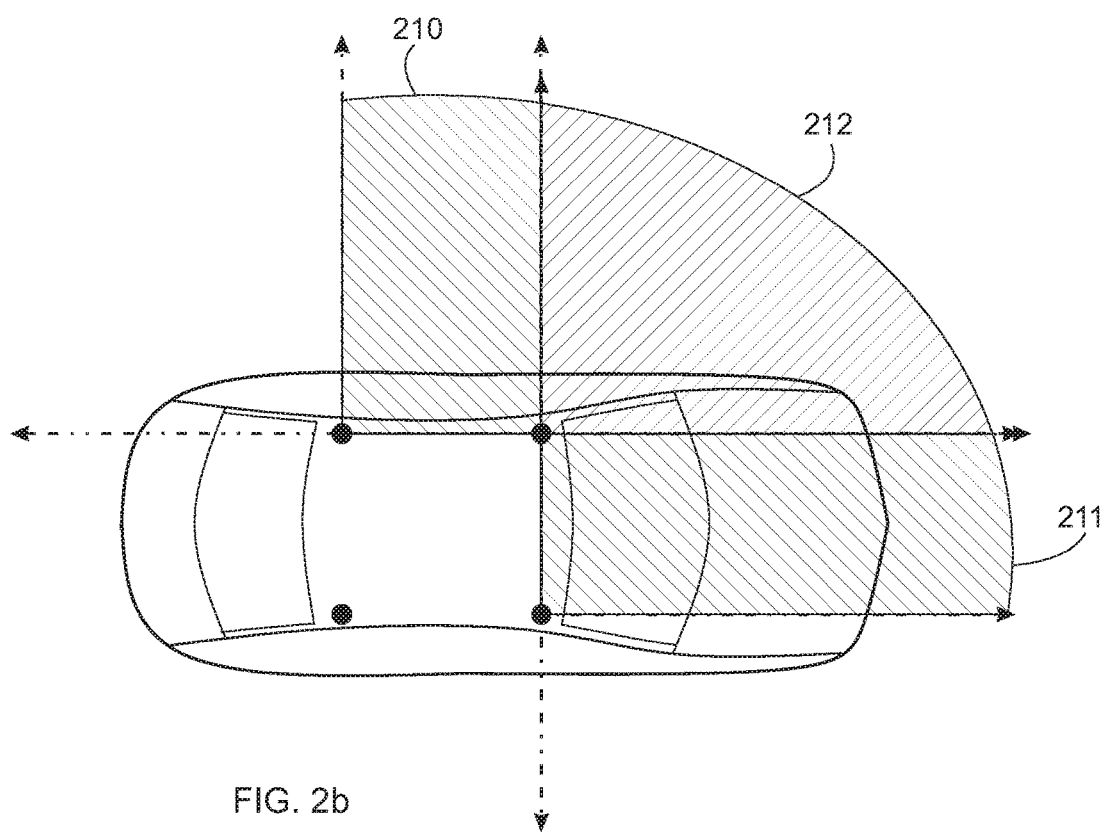
FIG. 2b illustrates primary and secondary converging fields of view according to an embodiment of the present disclosure.
Figure 2C:
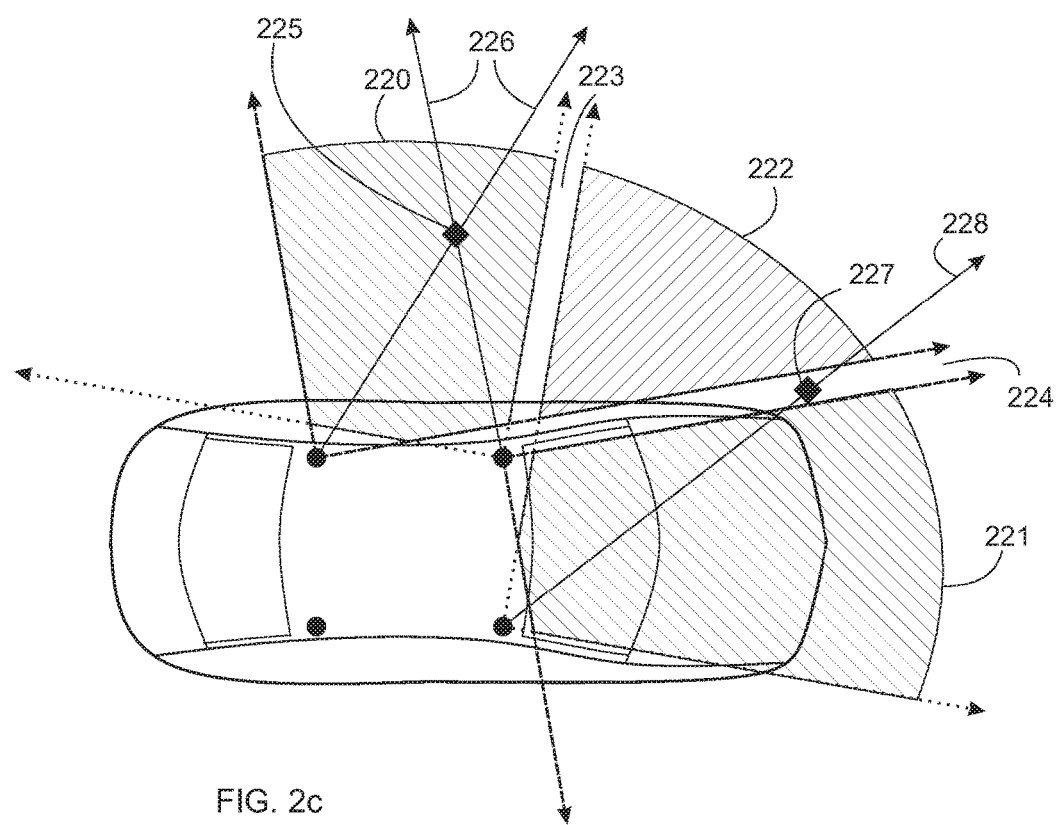
FIG. 2c illustrates diverging areas of convergence created by rotating the cameras slightly according to an embodiment of the present disclosure.

Referring to FIG. 2b, fields of view 201 and 202 may create sector of convergence 210, where an object would appear to both cameras associated with these fields of view. Sectors of convergence 210 and 211 may be called primary sectors of convergence because they are created by cameras in adjacent pods. In contrast, there may be secondary sectors of convergence, such as 212, created by non-adjacent cameras, in this case, those associated with fields of view 201 and 204. Preferably, the axes of the fields of view may be rotated slightly from an exact 45 degree incline in order to improve the shapes of the sectors of convergence. Referring to FIG. 2c, sectors 220, 221, and 222 may correspond to sectors 210, 211, and 212 of FIG. 2b, but a slight rotation of each camera axis may make the distribution of the sectors around the motor vehicle more uniform.

Consider object 225, which is on two lines of sight 226 in fields of view 201 and 202. If object 225 is in motion, changes in scenery may occur simultaneously along both lines of sight at comparable heights from the ground, signaling movement within sector 220. The fact of simultaneity signals the presence of object 225 without the computationally expensive image processing needed for actual object recognition. The angles of the lines of sight may determine the position of object 225, including its distance from motor vehicle 100. Thus, motion in a defined proximity of the vehicle may be detected, as will be explained below.

Continuing with FIG. 2c, there may be sectors such as 223 and 224 that exist in only one field of view, which is a consequence of assuming the individual fields of view subtend no more than 90 degrees. Consider object 227 in sector 224, appearing only in field of view 204. Here, the narrow shape of sector 224 may be exploited to determine the position of object 227, the presence of which is signaled by changes in field of view 204 that are not simultaneous with corresponding changes in field of view 203 or field of view 201. Object 227 can only be localized to somewhere along line of sight 228 that is not within sectors 221 or 222, but due to the narrowness of sector 224, this is acceptable.

Figures 3A, 3B:
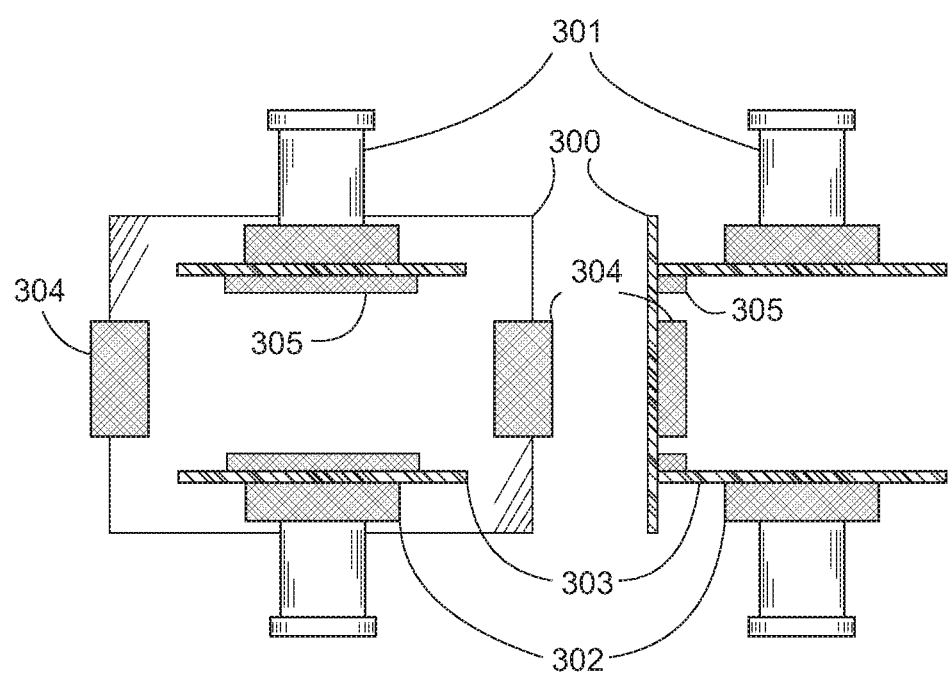
FIG. 3a illustrates the configuration of cameras and printed circuit boards inside a pod in plan view according to an embodiment of the present disclosure.
FIG. 3b illustrates an elevation of the cameras and printed circuit boards inside a pod according to an embodiment of the present disclosure.

Referring to FIG. 3a, this is a plan view of the assembly inside camera pod 101, and FIG. 3b is an elevation view of same. The assembly may include baseboard 300, which is a printed circuit board with a Field Programmable Gate Array (FPGA 500, below) and supporting circuitry, which will be discussed further below. Each camera may include lens assembly 301, lens holder 302, and an image sensor which may be covered by lens holder 302 and soldered to daughterboard 303. Right-angle headers 305 may serve to connect signals and power from baseboard 300 to each daughterboard 303. There may be two I/O connectors 304 soldered to baseboard 300 which may carry power and signals from flat power and data cables 102.

Figure 3C:
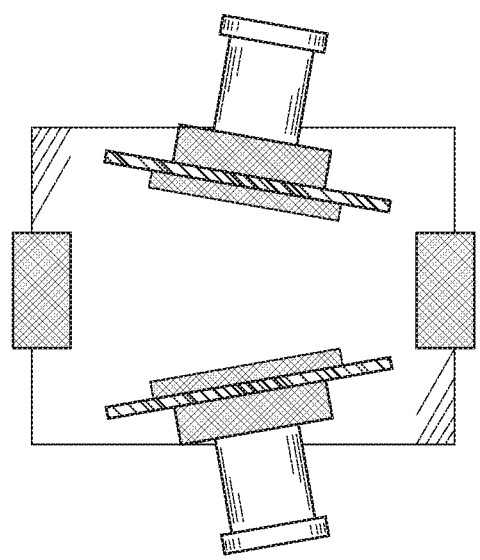
FIG. 3c is a plan view with the cameras reoriented slightly in order to achieve the fields of view illustrated in FIG. 2c according to an embodiment of the present disclosure.

FIG. 3a and FIG. 3b depict the cameras as aimed in opposing directions, which may give the fields of view illustrated in FIG. 2a and FIG. 2b. In order to achieve the more optimal fields of view illustrated in FIG. 2c, the upper camera in FIG. 3a may be reoriented 10 degrees clockwise, while the lower camera may be reoriented 10 degrees counter-clockwise, as depicted in FIG. 3c. This configuration may be used in all four locations of camera pod 101.

Figure 4:
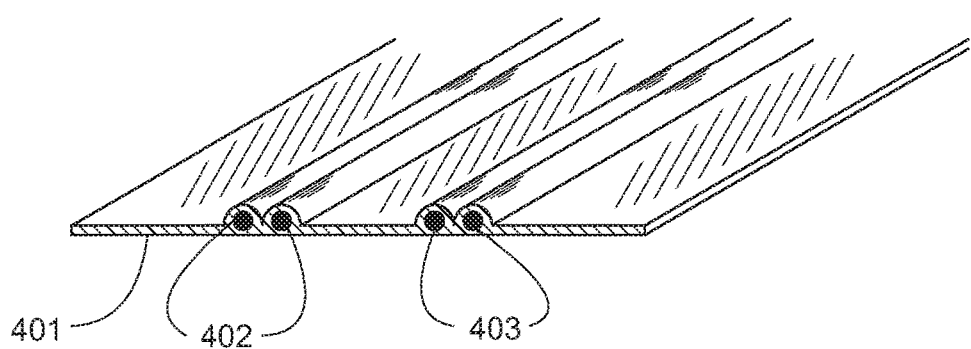
FIG. 4 depicts a form of flat power and data cables that attach to the exterior of a motor vehicle for wiring pods to a Central Recording Unit according to an embodiment of the present disclosure.

FIG. 4, depicting the form of flat power and data cables 102 according to an embodiment of the present disclosure. Two conductor pairs 402 and 403 may be embedded in a weatherproof insulating tape that is adhesive-backed for attaching to the exterior of motor vehicle 100. Each conductor pair may carry signals to and from a pod using differential signaling. The two pairs together also may carry power to each pod using the well-known "phantom pair" technique, used, for example, in power-over-Ethernet schemes.

Figure 5:
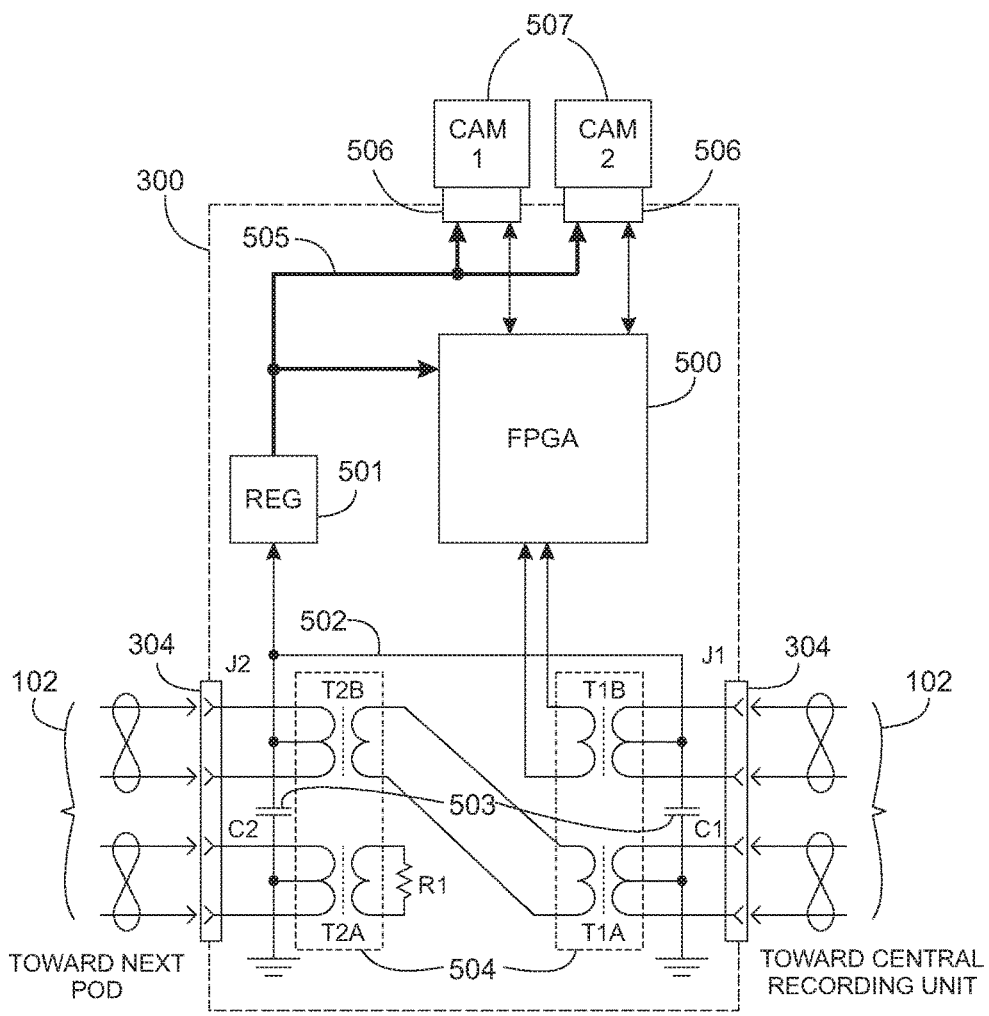
FIG. 5 is a schematic diagram illustrating how power and data signals may be transferred into and through a camera pod according to an embodiment of the present disclosure.

FIG. 5 depicts schematically the components of a camera pod and the flow of signals and power according to an embodiment of the present disclosure. Flat power and data cables 102 may plug into connectors 304 mounted on baseboard 300. If this pod is closest to Central Recording Unit (CRU) 103, then the cable plugged into J1 may connect to CRU 103, and the cable that plugs into J2 may connect the next pod on the same side of the motor vehicle. (See FIG. 1.) Otherwise, the cable plugged into J1 may connect to the pod closest to CRU 103 on the same side of the car, and nothing may plug into J2.

There may be two dual pulse transformers 504. T1B may provide electrical isolation for a differential signal on the first conductor pair from J1 to FPGA 500. T1A may be cross-connected to T2B. If this pod is closest to CRU 103, the differential signal on the second pair from J1 may be on the first pair at the next pod, due to this cross-connection, although there may be a small amount of insertion loss due to T1A and T2B. T2A may carry no differential signal, and R1 may only be used to dampen any electrical noise. Thus, the same camera pod design may be used in each location.

Pulse transformers 504 may block the flow of direct current, which may prevent power from being applied to the signal pins of FPGA 500. Instead, power may flow longitudinally through each cable pair from CRU 103 to each pod. Approximately +18V may flow from right to left in the upper pair of each cable 102, referenced in the orientation of FIG. 5. Likewise, the return current path may be from left to right in the lower pair of each cable, at approximately the same voltage potential as the chassis of the motor vehicle. Each camera pod may be electrically insulated from the motor vehicle.

Power may flow through each transformer in the common mode, generating no net magnetic flux to affect differential signals, and may be accessed using the center taps. Capacitors 503 may provide noise decoupling. Current may pass from right to left through connection 502 and left to right through the pod ground reference. Power may be regulated for internal use by step-down regulator 501. Regulated power may be distributed to the FPGA and to camera connectors 506 over power bus 505. CRU 103 may provide solid state current limiting as well as fuse protection for the power delivered over cables 102, so that damage to a cable or pod may not create a hazard.

FPGA 500 may communicate with CRU 103 using low voltage differential signaling in a half-duplex poll/response manner. Signals may be sent as packets of varying lengths, e.g. short packets for commands from the CRU, and long packets for frames of video data. FPGA 500 may communicate to cameras 507 through connectors 506. Each camera may comprise 301, 302, 303, and 305 of FIGS. 3a and 3b. FPGA 500 may control each camera's mode of operation and whether it captures video frames or still images. In this embodiment of the present disclosure, FPGA 500 may compress each image or video frame using JPEG compression, which may provide an optimal trade-off between compression level and computing power needed. JPEG compression of video (Motion JPEG) also may allow for rapid random access of individual frames in video files or streams by the CRU, again with limited computing power. More advanced compression, such as MPEG, may require decompressing larger chunks of frames to get at one.

In this embodiment of the present disclosure, the bit rate transmitted over each differential pair may be 62 Mbs. This may allow video frames compressed to 125 kB per frame, or 1 Mbit, to be sent back to the CRU at up to 30 frames per second, while leaving idle time for receiving commands. The packets may not be formatted as true Ethernet packets, as there is no need for a MAC address. The packet overhead may be limited to a preamble for syncing, a packet type indicator, and a frame check sequence (cyclic redundancy check).

Figure 6A:
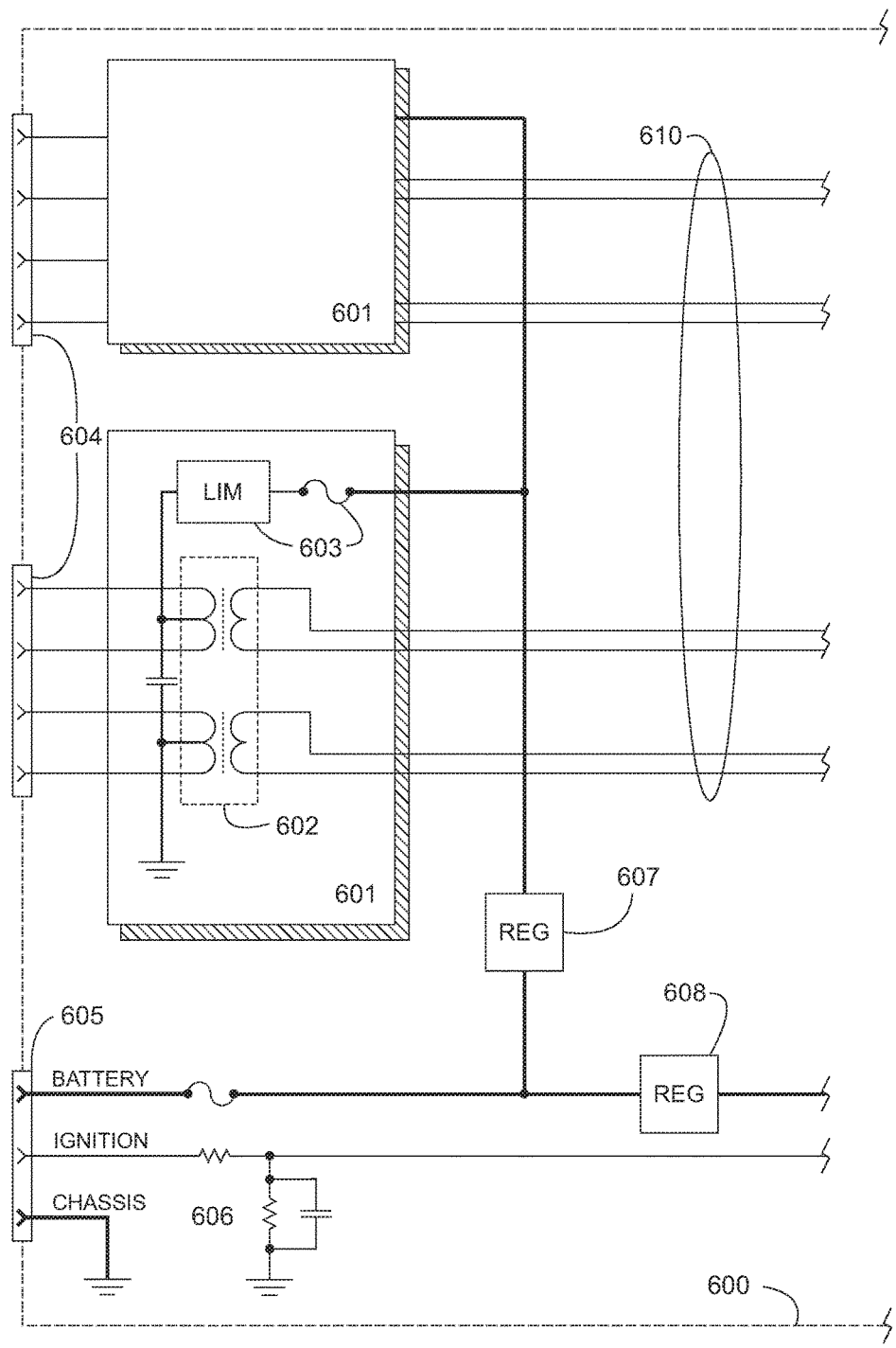
FIG. 6a is a schematic diagram of a Central Recording Unit depicting the connections to the camera pods as well as the connection to the motor vehicle battery according to an embodiment of the present disclosure.
Figure 6B:
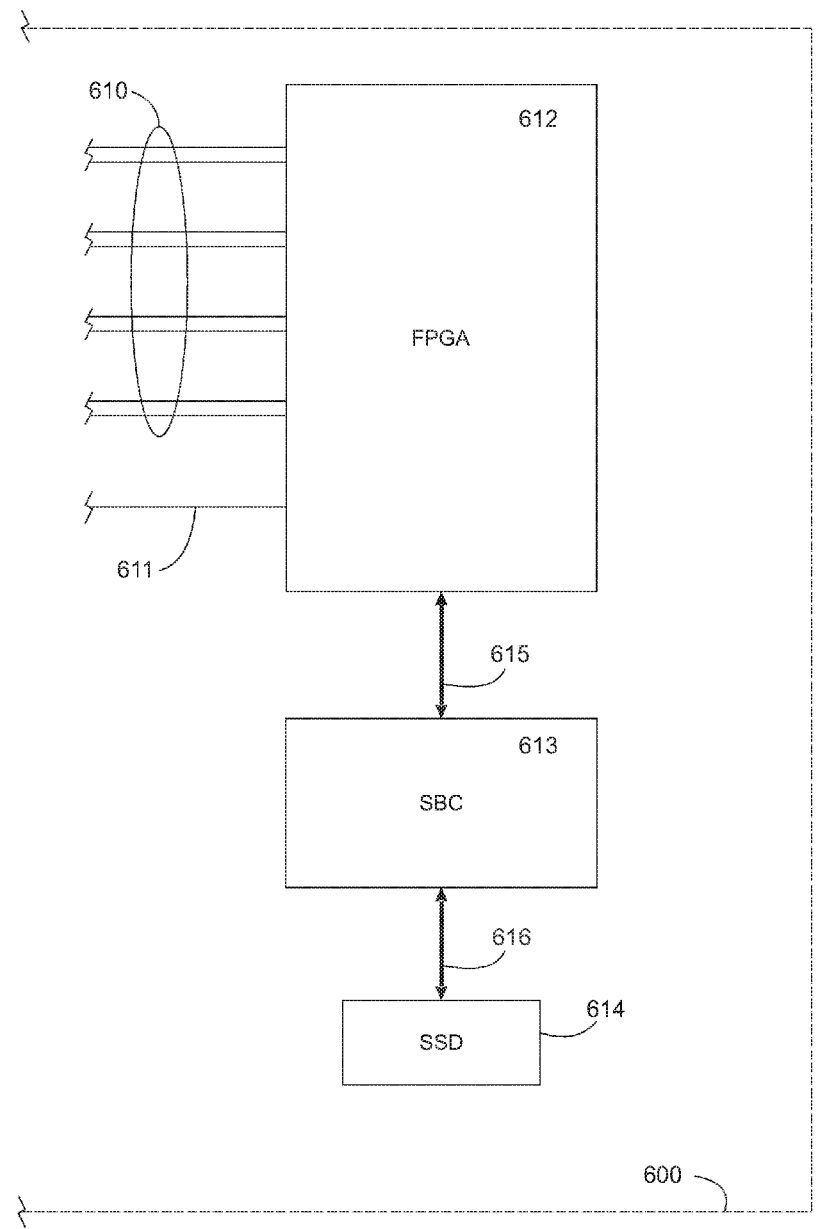
FIG. 6b is a schematic diagram of a Central Recording Unit showing the FPGA responsible for coordinated differential detection and the components needed for recording according to an embodiment of the present disclosure.

Central Recording Unit 103 according to an embodiment of the present disclosure is shown schematically in FIGS. 6a and 6b. Referring first to FIG. 6a, CRU Baseboard 600 may be a printed circuit board that carries the electrical components. Cable coupling circuits 601 may connect to flat power and data cables 102. Four camera pods 101 may be arranged as pairs on each side of the motor vehicle. Each pair of pods may be interconnected with a flat power and data cable between them, with another from the front pod to the CRU. (See FIG. 1.) Therefore, there may be two flat power and data cables connecting to the CRU, one leading to the two pods on the left side of the car, and the other to the two pods on the right side. In turn, one cable coupling circuit 601 deals with the left side of the car, and the other with the right.

Within each cable coupling circuit, dual pulse transformer 602 may provide electrical isolation for the differential pairs, of which there may be two, one for the front pod and one for the rear. With two cable coupling circuits, there may be a total of four differential pairs 610, one corresponding to each camera pod. In addition, the two sides of each pulse transformer may feed 18V power to the pods through the flat power and data cable, in the "phantom pair" manner discussed with respect to FIG. 5. Protection circuit 603 may comprise a solid state current limiter employing a MOSFET pass element, both for low "on" resistance for normal operation and for rapid shut-off in the event of an overcurrent, as well as a fuse for secondary protection in the event of hazardous damage to the limiter itself. Regulator 607 may be a non-isolated boost converter that steps up the battery voltage to 18V for feeding power to the camera pods. The flat power and data cables may plug into connectors 604.

A cable from the fuse box in the motor vehicle's engine compartment may plug in to connector 605. This cable may contain three conductors. BATTERY may supply power from the motor vehicle battery and is "always on," that is, not interrupted by the ignition switch. In contrast, IGNITION may supply voltage only when the ignition switch is in the "on" position. This voltage may be divided and filtered by circuit 606, allowing the CRU to sense the state of the ignition switch. Finally, CHASSIS comes from the car chassis and may serve as a ground reference and battery return. Regulator 608 may be a non-isolated step-down converter that supplies various voltage rails to the rest of the CRU.

Referring now to FIG. 6b, differential pairs 610 may be compatible with low voltage differential signaling and connect to FPGA 612, which in turn may control the camera pods with commands and receives video and/or image data compressed with JPEG, as discussed with respect to FIG. 5. Further, FPGA 612 may perform coordinated differential detection on selected pairs of cameras. Further, ignition sense 611 also may connect to FPGA 612, informing the control logic contained within whether the motor vehicle's engine is running.

FPGA 612 may communicate with, and control, single board computer (SBC) 613 by means of interface 615, comprising a PCIE bus as well as signals to put the SBC into a low-power sleep mode, wake it up, and perform a hard reset if needed. A commercial SBC running the Linux operating system may be used in this embodiment of the present disclosure, but an equivalent set of integrated circuits can be soldered directly to CRU Baseboard 600 to save cost without departing from the present disclosure.

SBC 613 may communicate with solid state drive (SSD) 614 using interface 616, which may be a standard SATA interface for computer storage. Commercial SSDs of 480 GB or 960 GB may be used in embodiments of the present disclosure. It will be understood that each of these blocks may receive power from regulator 608, which may deliver all the voltage rails necessary. SBC 613 may be equipped with various useful interfaces, such as USB for keyboard, mouse, and external backup storage, as well as Wi-Fi for access by a laptop computer, tablet, or smartphone.

In summary, from an operational perspective, embodiments of the present disclosure may comprise eight cameras located in four camera pods 101, communicating with FPGA 612 located in CRU 103. FPGA 612 may perform coordinated differential detection, may communicate with SBC 613, which in turn may read and write files on SSD 614, and also may send recordings to a remote data storage.

MODES OF OPERATION

There may be two main modes of operation depending upon the state of ignition sense 611. In the driving mode of operation, all eight cameras may operate in full-motion video mode, with frame rates optionally selectable up to 30 frames per second. FPGA 612 may receive streaming video data from each camera in Motion JPEG format and pass this data to SBC 613, which in turn may record the data onto SSD 614. In the park mode of operation, the motor vehicle's engine may be turned off and the surveillance system may run on the motor vehicle's battery, so the power draw must be minimized. Also, the motor vehicle may be parked for many more hours than it is driven, and it may not be economical to provide storage to record full video from multiple cameras for more than a few hours, so instead images may be sampled at a much lower frame rate and CDD may be used to determine when to record full video of scenery of interest (i.e., scenery identified as having movement of security interest).

What follows is a set of illustrative calculations that apply to embodiments of the present disclosure. It should be understood that the calculations can vary with different video frame rates, JPEG compression levels, etc., in order to optimize for a particular application or the user's desires. As in conventional surveillance systems, some users prefer to sacrifice image resolution for greater storage, while others may accept lower video frame rates in order to gain higher resolution without sacrificing too much storage capacity, etc.

Images from each camera 507 may be compressed with JPEG to approximately 125 KB per frame. In drive mode, the streaming data from eight cameras at 24 frames per second may total up to 24 MB per second, or 86.4 GB per hour.

In park mode, imagery may be sampled at 1 frame per second, which may be accomplished with cameras 507 programmed to operate in a "snap-shot mode" rather than full motion video, for reduced power consumption. The data from eight cameras may total up to 1 MB per second, or 3.6 GB per hour. To further reduce power consumption in park mode, FPGA 612 may put SBC 613 into a low-power "sleep" mode, similar to the sleep mode of a laptop computer, and wake it briefly at five-minute intervals to record batches of collected image data onto SSD 614.

It should be appreciated that while park mode may be considered a low-power operating mode, days of parking can still discharge the motor vehicle's battery. Therefore, the battery voltage may be compared against a low-voltage threshold, and the system may be shut down completely if the threshold is crossed. This circuit is not shown in the drawings, but uses well-known methods for comparing voltages and controlling a MOSFET pass transistor.

Storage Calculations

If a motor vehicle is being driven an hour per day, e.g., commuting to and from work, then the total data recorded may be 86.4 GB/hour×1 hour+3.6 GB/hour×23 hours, or 169 GB per day. A number of options are available for solid state drive 614, including two or more drives for added capacity, but a reasonably economical option is a single 480 GB drive, which can store a little less than three day's worth as just calculated.

SSD 614 may provide storage local to the motor vehicle. In this embodiment of the present disclosure, so-called cloud storage also may be available through data transmission over common 4G/LTE cell phone networks, or Wi-Fi hotspots where available. Cloud storage is nearly unlimited, but the storage and especially the data transmission do cost money, and so still need to be used efficiently. Embodiments of the present disclosure may use the following scheme, along with CDD, to make efficient use of storage.

A portion of SSD 614 may be set aside for endless circular storage, meaning that new data may be appended in the storage area until the end of the area is reached. Then the process may move to the beginning of the area and continue appending as before. In this way, a sequential record of the previous one or two days' worth of imagery may be maintained, with older data discarded.

A second portion of SSD 614 may be set aside for extracted circular storage. This may be operated in the same way as the endless circular storage just discussed, but may be used to store scenery of interest identified with CDD.

Both endless circular and extracted circular storage may be managed by SBC 613 without intervention by a user. A third portion of SSD 614 may be set aside for permanent storage, and may be used to store scenery of interest marked by a user for preservation. The user can also designate that the previous few minutes of current video or sampled imagery be preserved as user-designated scenery in permanent storage in some embodiments of the present disclosure.

Cloud storage is an optional way of backing up scenery of interest as well as user-designated scenery, taking advantage of the greater capacity of cloud storage at reasonable cost, as well as minimizing the data fees associated with transmission over a 4G/LTE network.

Coordinated Differential Detection

FPGA 612 may perform coordinated differential detection for each of the primary and secondary sectors of convergence. At a periodic rate, such as once per second in park mode, the FPGA may capture an image frame from each camera and decompress the image data. For each decompressed frame, it may compute a differential with a stored previous decompressed frame, then discard the previous frame. Next, for selected pairs of frames, the FPGA may identify differentials that share a common approximate height above ground and involve comparable color hues, if daylight, or luminosities, if night time. Each correlation may be taken to signal the movement of an object, although there may be no attempt to recognize the object.

Figure 7A:
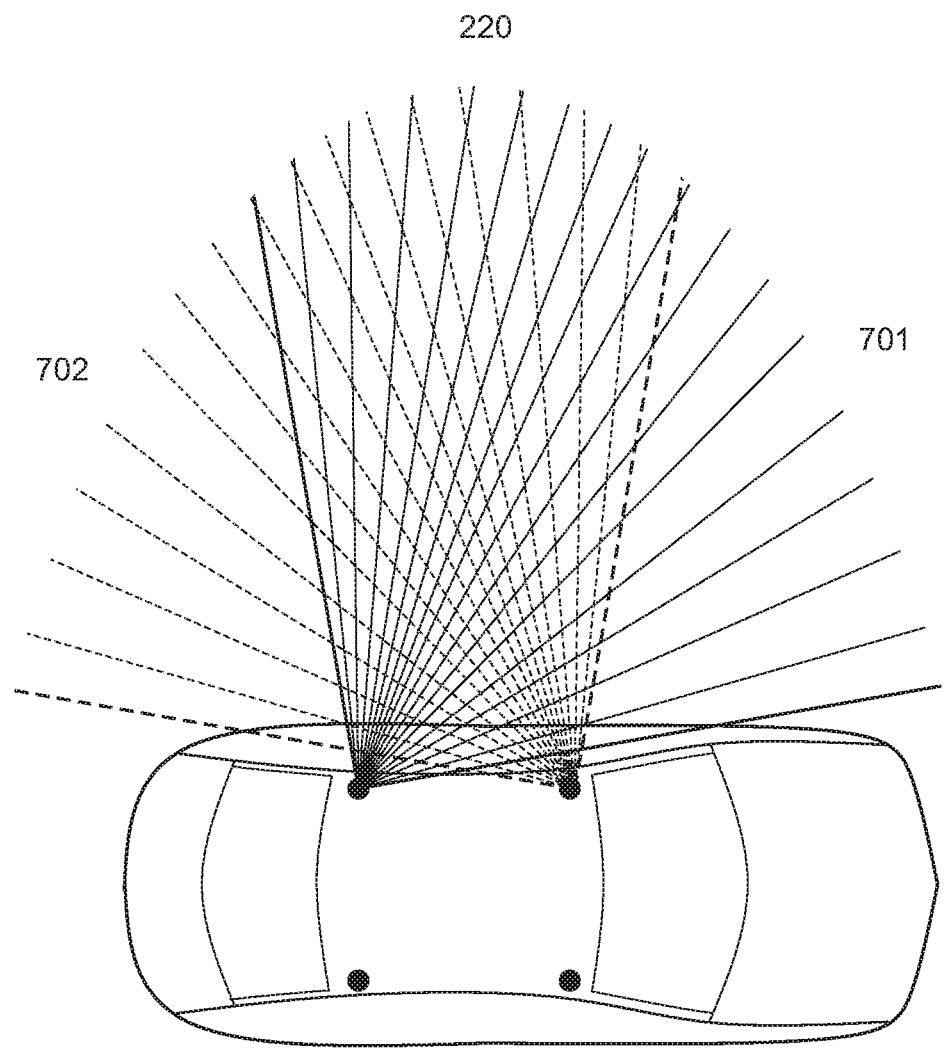
FIG. 7a depicts the regions in a sector of convergence defined by a look-up table of coarse horizontal components according to an embodiment of the present disclosure.

For each correlation, an approximate position with respect to the motor vehicle may be determined by means of previously-calculated lookup tables. The horizontal axis of each image may be divided into 32 segments, or coarse coordinates. The vertical axis of each image may be similarly divided into 32 rows, which may be used with coordinated differential detection to determine that differences in the images frames of two cameras occur at comparable height. For each pair of frames corresponding to a sector of convergence, there may be a lookup table with 1024 regions defined in that sector, each region corresponding to a pair of coarse coordinates. FIG. 7a illustrates this method using a smaller number of coarse coordinates for clarity. Rays 70 (solid lines) may divide field of view 1 into sectors representing the coarse horizontal coordinates in its camera's image. Similarly, rays 702 (dashed lines) do the same for field of view 2. Sector of convergence 220 may be divided into quadrilateral regions, where each region may correspond to a unique pair of coarse horizontal components. It will be apparent that there is more positional resolution closer to the motor vehicle than further away, which is perfectly suitable for the application.

Recall the discussion of how object 227 may be located when it appears in only one field of view. In this case, it is the absence of CDD that may place object 227 within sector 224 and along line of sight 228, which may be found using a look-up table relating the single coarse coordinate value to one of 32 regions of sector 224.

Figure 7B:
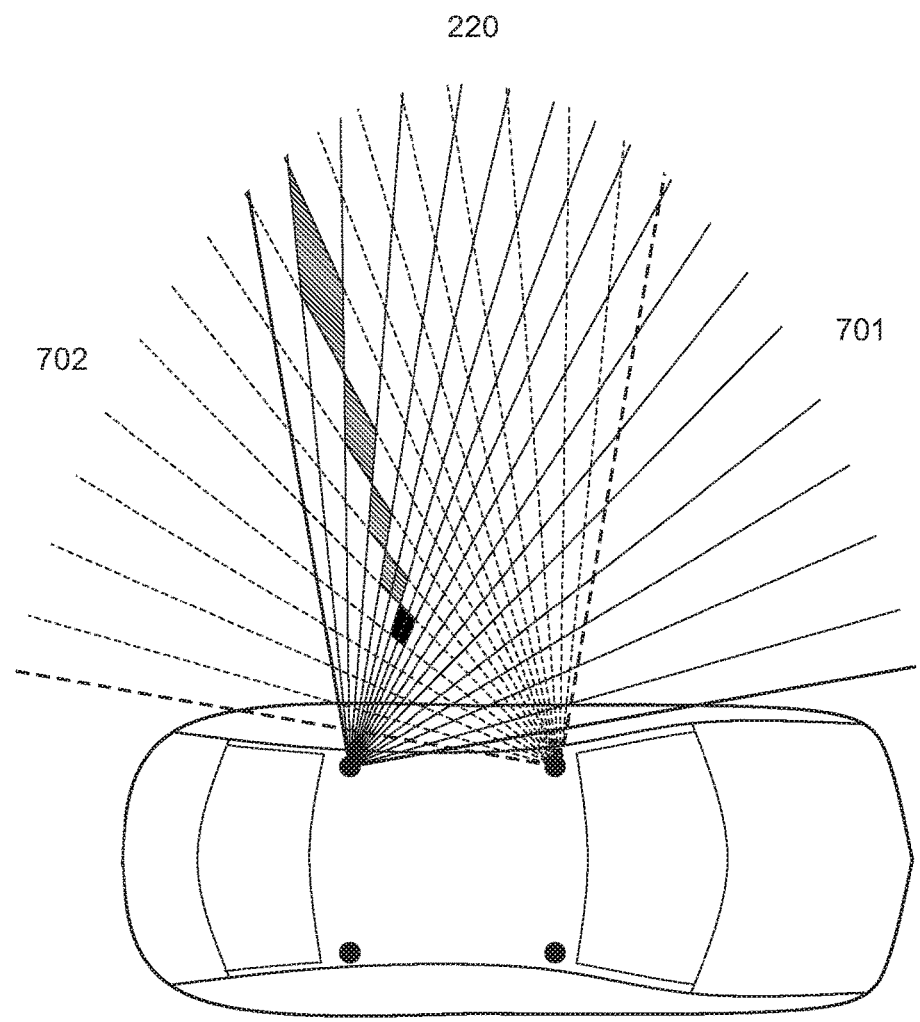
FIG. 7b illustrates identifying the trajectory of a moving object by means of successive coordinated differential detection according to an embodiment of the present disclosure.

It should be appreciated that the approximate trajectory and speed of a moving object may be computed from a sequence of related CDDs, as illustrated by the partially- and fully-shaded quadrilaterals in FIG. 7b. It should be understood that the actual resolution of shaded quadrilaterals is significantly finer, since the illustration depicts fewer coarse coordinates for clarity. For example, this might be the moving backup light of another motor vehicle. Even though the system may not have the computational power to recognize a "motor vehicle" object, it may be easily able to determine that an object is on a collision course. This can be used to trigger full video from this pair of cameras in park mode, so that a full-motion video of the scene leading up to an actual collision or near-collision may be recorded, should CDD then determine the threshold of proximity has been crossed, as indicated by the set of fully shaded quadrilaterals. If the object does not reach the threshold, the video may be discarded and the cameras returned to park mode.

In outdoor environments, especially at night, there may be stationary objects in proximity to a pair of cameras, such as a post or a parked vehicle, one or more of which may be periodically illuminated by a flashing light somewhere nearby. The flash of the flashing light may come at regular intervals, as in the case of a traffic light, or at irregular intervals, as with passing headlights. In either case, CDD may detect what appears to be movement within the defined proximity.

In these cases, when the object is stationary, the coordinates reported by CDD (horizontal and vertical, or range and position) may be approximately the same with each flash of light. SBC 613 may use this fact to identify stationary objects. The SBC may make recordings for the first few flashes, and subsequently may ignore them unless the coordinates change, indicating actual movement.

Many objects of security interest, such as other vehicles, may have large areas of substantially similar coloration. If the object is moving, only the edges of these areas that are roughly perpendicular to movement (or expansion and contraction if the object is moving toward or away) may create differentials. However, variations in coloration or shadows may also appear as edges and create differentials. In many rows of each image frame (left and right views), there may be multiple plausible correlations. Finding the parallax for each possible combination may lead to a cluster of ranges around the actual range of the object. It may be acceptable to use (for proximity purposes) the minimum range in the cluster, or the average. It also may be possible to exclude rows where there are multiple plausible correlations, and only use for proximity rows where unique correlations are found. Since the objective is to detect motion within a defined proximity, and not to identify the object, this may be advantageous.

Each image frame may be composed of a large number of pixels, for example, 337,920 pixels for an NTSC-compatible frame, or 2,073,600 for an HD frame. Such resolutions may be useful for review and inspection tasks, such as recognizing faces or reading license plates from recorded video, but can make identifying differentials at a common vertical height more difficult, due to slight misalignment between the elevation of each camera's line of sight, or due to the field-of-view curvature caused by the relatively short focal length of a camera lens that gives a 90° field of view.

Field-of-view curvature can be partially compensated by remapping pixels according to a pre-computed pattern. In addition, FPGA 612 may perform a decimation of the differentials derived from each camera, to arrive at a lower resolution for use in correlation. For example, it may average the information in rectangles of N-by-M adjacent pixels, converting the frame image differentials into X-by-Y tiles, and then perform correlation on the tiles instead of the original differentials. Since each tile is an average of differentials from N-by-M pixels, the FPGA may correlate differentials at approximately the same vertical height between two cameras despite optical and mechanical misalignments. The resulting horizontal coordinates may be more coarse than the original resolution, by the factor N, but this is still consistent with the examples previously discussed.

The optimal values for N and M, and therefore the size of the tiles, may be determined approximately as follows. Larger tiles (N and M larger) reduce the needed capacity of FPGA 612 and allow for larger misalignments, but at the cost that more differentials, and therefore, more image frame information, may be blended together into each tile, making it more difficult to find unique correlations between cameras. On the other hand, if the tiles are too small (N and M too small), the effects of misalignments also may be more pronounced, and once again, it may become more difficult to find unique correlations between cameras. An optimal range of values may therefore be found by taking into consideration the expected misalignments in a manufactured product.

It should be appreciated that these techniques may accomplish the detection of motion within a defined proximity without the need for the expensive and battery-draining computational power that would be needed to identify and track objects in real time by means of software algorithms. It should be further appreciated that, for the purposes of controlling the recording and storage of scenery of interest that will be later interpreted by human beings, this is sufficient.

User Interface

In embodiments of the present disclosure, SBC 613 may be equipped with Wi-Fi, which may allow ready networking with a smart phone or laptop computer. An Internet browser may be used to access web pages served by SBC 613 to review and download video, and to manage the system, for example, to designate scenery of interest for permanent storage as discussed above, or to change a proximity threshold for CDD.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, the cameras may be built into the structure of the vehicle rather than mounted on its roof. As another example, some advantages of this system, such as low-power operation, may be applied to surveillance around a fixed location where extended battery operation is desirable due to possible power outages. As another example, one or more FPGAs may be replaced by suitably low-powered application specific integrated circuits (ASICs). As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure.

Accordingly, the appended claims are intended to include within their scope such processes, machines, manufacture, compositions of matter, means, methods, or steps.

The invention claimed is:

1. A method of identifying scene changes as of interest, the method comprising:
 detecting frame-to-frame scene changes in two video cameras displaced from one another and having converging fields of view to output coordinates of each area of change;
 using the coordinates of each area of change, correlating scene changes of comparable vertical height relative to the ground that are simultaneous between the two cameras, and outputting image coordinates;
 evaluating displacement of the image coordinates to determine distance to movement causing the scene changes;
 comparing the distance to movement causing the scene changes to a proximity threshold; and
 outputting a signal that instructs performance of one of a plurality of actions.

2. The method of claim 1 further comprising:
 correlating in time color of the scene changes; and
 computing proximity using a parallax between the scene changes.

3. The method of claim 1 further comprising:
 correlating in time luminosity of the scene changes; and
 computing proximity using a parallax between the scene changes.

4. The method of claim 1, wherein the scene changes are changes to a limited area of an image in successive images in time or frames of a video stream where a stationary flashing object has not been detected.

* * * * *